United States Patent [19]
Strangio

[11] Patent Number: 5,170,747
[45] Date of Patent: Dec. 15, 1992

[54] BIRD OBSERVATORY WITH ONE-WAY OBSERVATION WINDOW

[76] Inventor: Richard Strangio, P.O. Box 6591, San Jose, Calif. 95150

[21] Appl. No.: 865,566

[22] Filed: Apr. 9, 1992

[51] Int. Cl.$^5$ ............................................. A01K 31/00
[52] U.S. Cl. ........................................ 119/23; 119/15
[58] Field of Search .................... 119/23, 26, 15, 52.2, 119/57.8

[56] References Cited

U.S. PATENT DOCUMENTS

| | | | |
|---|---|---|---|
| 1,169,409 | 1/1916 | Larson | 119/23 |
| 2,080,160 | 5/1937 | Austin | 119/65 |
| 3,087,460 | 4/1963 | Stone | 119/23 |
| 3,177,849 | 4/1965 | Isenberg | 119/23 |
| 3,211,130 | 10/1965 | Prince | 119/23 |
| 3,282,251 | 11/1966 | Dahmus | 119/23 |
| 3,295,498 | 1/1967 | Brown | 119/23 |
| 3,774,576 | 11/1973 | Moore | 119/17 |
| 3,792,685 | 2/1974 | Wiener | 119/23 |
| 4,753,195 | 6/1988 | Maggio | 119/52.2 |
| 4,881,491 | 11/1989 | Brown | 119/51.01 |
| 4,892,060 | 1/1990 | Lundquist | 119/52.2 |
| 4,928,631 | 5/1990 | Smith | 119/23 |
| 5,016,571 | 5/1991 | Totaro | 119/23 |

FOREIGN PATENT DOCUMENTS

| | | | |
|---|---|---|---|
| 3439188 | 1/1986 | Fed. Rep. of Germany | 119/23 |
| 3620449 | 12/1987 | Fed. Rep. of Germany | |
| 2240910 | 8/1991 | United Kingdom | 119/23 |

Primary Examiner—John G. Weiss
Attorney, Agent, or Firm—Townsend and Townsend

[57] ABSTRACT

A bird observatory mountable adjacent a glass window of a room of a building has a bird enclosure with an opening permitting birds to enter and exit the enclosure. A one-way window lies adjacent one side of the glass window. An opaque cover is positioned adjacent the other side of the glass window opposite the enclosure and is moveable between two positions. The first position covers the one-way window so that birds in the enclosure cannot see through the one-way window into the interior of the room. The opaque cover's second position exposes the one-way window so that observers may see the birds in the enclosure through the one-way window. The opaque cover is used in the first position to cover the one-way window when the interior of the room is darker than the interior of the bird observatory preventing birds in the observatory form seeing into the interior of the room.

13 Claims, 2 Drawing Sheets

BIRD OBSERVATORY WITH ONE-WAY OBSERVATION WINDOW

BACKGROUND OF THE INVENTION

The present invention relates to the field of bird houses and observatories. Bird houses provide a home for birds in which the birds may safely nest. A bird observatory combines the features of a bird house with the added feature of providing visual access to the enclosure so that people may observe the birds. Bird observatories allow people to study the nesting, feeding, and growth patterns of birds.

A glass bird observatory is disclosed in U.S. Pat. No. 5,016,571 in the background of the invention. The glass observatory allows observers to see into the bird house but also permits birds to see the observers. Birds which are studied may be scared or startled by observers looking into the house. This is a problem since it is desirable to study birds in their natural, undisturbed state.

U.S. Pat. No. 5,016,571 to Totaro discloses a bird house with a one-way window. Unlike glass observatories, the one-way window permits observers to see the birds without the birds seeing the observers.

A problem with one-way windows is that when the light outside the observatory is relatively brighter than the light inside the observatory the birds are able to see out through the one-way window. This is a problem inherent in many conventional one-way window materials. As noted, permitting birds to see out through the one-way window is undesirable since the birds may be startled or scared.

A further problem with prior art bird observatories is that they are generally constructed in a manner not permitting quick disassembly and access. Oftentimes an observer may wish to clean the bird house or introduce nesting materials or food while the birds are temporarily away. Prior art observatories cannot be disassembled quickly permitting the observer to carry on such activities while the birds are temporarily away.

SUMMARY OF THE INVENTION

The problem of birds being able to see through the one-way window and becoming startled is overcome in accordance with the present invention by providing an opaque cover. The opaque cover is used to cover the one-way window when the lighting is such that the birds could otherwise see out through the one-way window.

The bird observatory of the present invention has a one-way window positioned against a glass window. The opaque cover, positionable adjacent the glass window, is moveable between a first position adjacent the one-way window and a second position spaced apart from the mirror. In the first position the opaque cover covers the one-way window so that birds cannot see out of the observatory while in the second position the one-way window is uncovered permitting observers to see into the enclosure. The opaque cover allows observers to select times for observation when the lighting is such that the birds cannot see out and therefore will not be disturbed or startled by objects seen through the one-way window.

The bird observatory is preferably designed to be easily dismantled and accessed. The bird observatory is comprised of structural elements having slots and tabs for easy assembly. A pin holds the tab in place once the tab is inserted in the slot. The pin is easily removed so that the bird observatory may be partially dismantled for quick access into the bird observatory. Quick access permits observers to clean the bird house or introduce food or nesting materials while the birds are temporarily away.

Other features and advantages of the present invention will appear from the following description in which the preferred embodiments have been set forth in detail in conjunction with the accompanying drawings.

DESCRIPTION OF THE PREFERRED EMBODIMENTS

Figure 1:
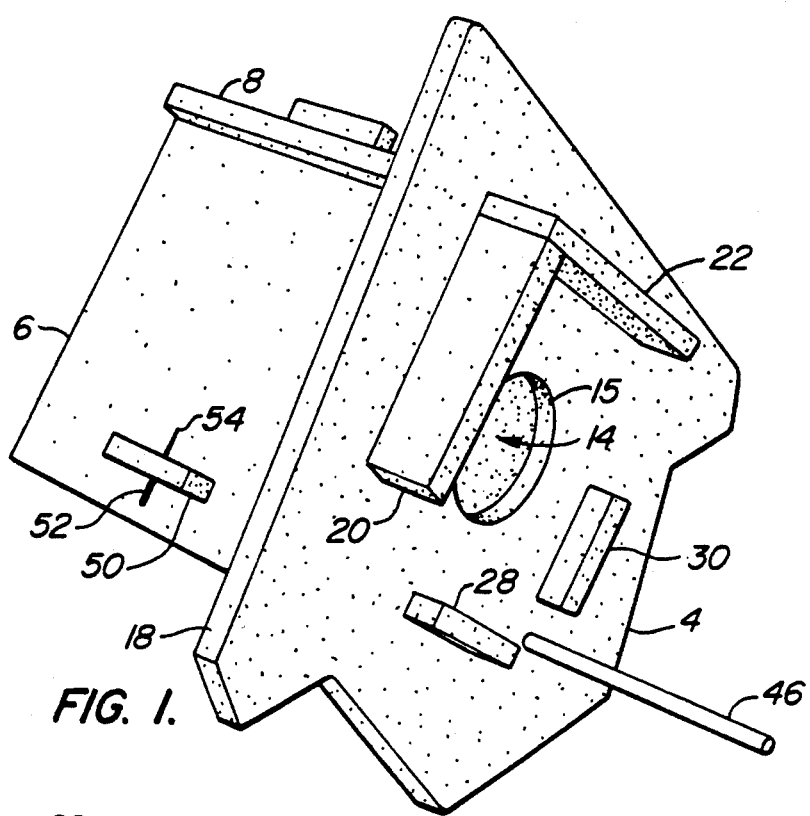
FIG. 1 illustrates the bird observatory.
Figure 3:
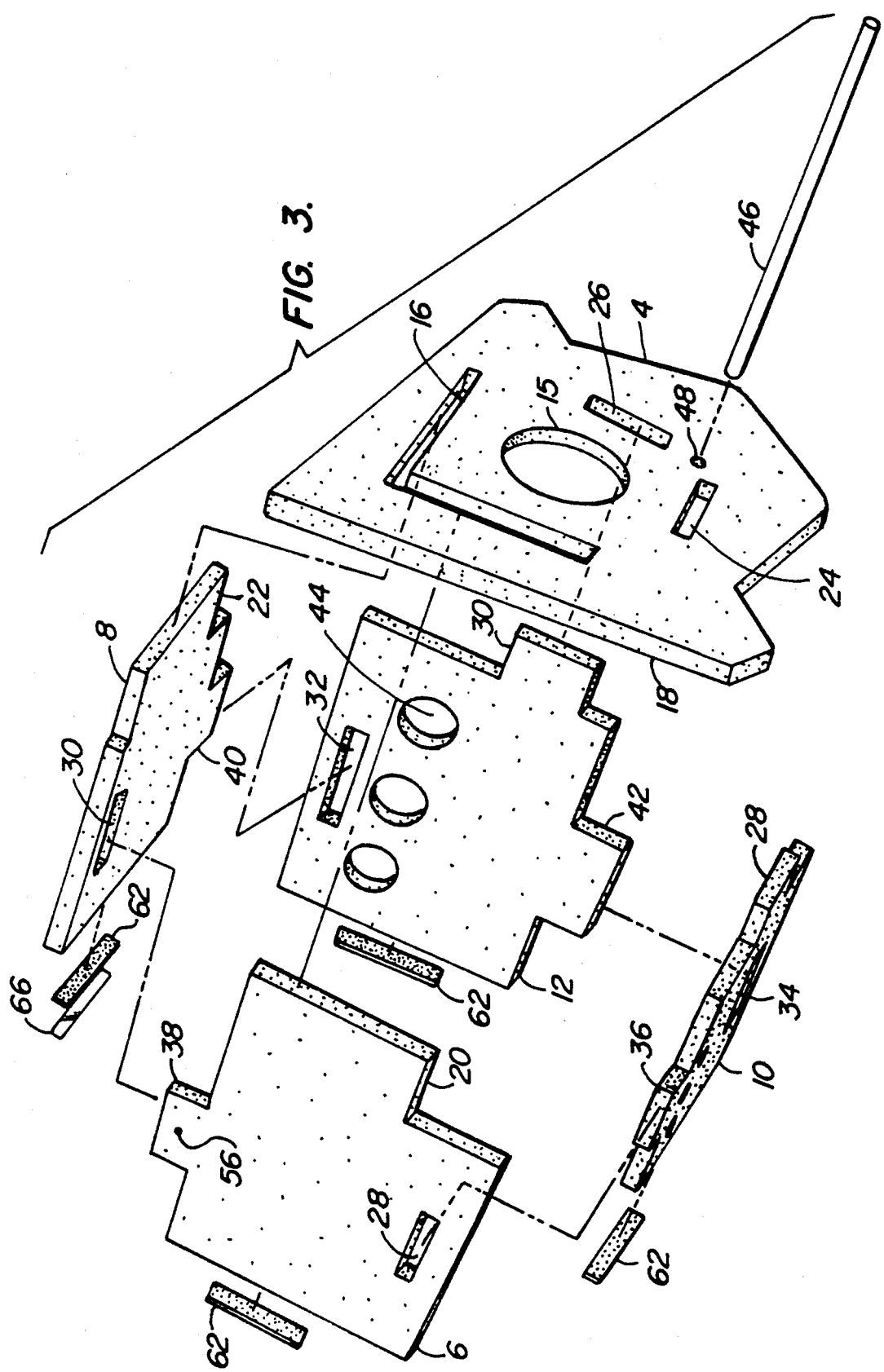
FIG. 3 is an exploded view of the bird enclosure.

The bird observatory 2 of the present invention is illustrated in FIGS. 1 and 3. Bird observatory 2 is constructed of five structural elements, frontal element 4, roof elements 6, 8, and floor elements 10, 12 defining an enclosure 14. Frontal element 4 has an A-frame shape and includes an opening 15 through which birds can pass to enter observatory 2. An inverted V-shaped slot 16 follows an A-frame roofline 18 above opening 15. Slot 16 accepts tabs 20, 22 formed by adjacent roof elements 6, 8. Slots 24, 26 are formed in frontal element 4 below opening 14 and are sized to accept tabs 28, 30 formed by floor elements 10, 12. Floor elements 10, 12 and roof elements 6, 8 are connected together via slots 28, 30, 32, 34 and tabs 36, 38, 40, 42 formed by elements 6, 8, 10, 12. Floor elements 10, 12 each have three additional openings 44 for ventilation and to admit light into enclosure 14. A roosting bar 46 inserts into a roosting aperture 48 of frontal element 4.

The tab and slot connections are described below with reference to tab 36 and slot 28, however, the following is generally applicable to the other tab and slot constructions. Tab 36 fits into slot 28 with an extended portion 50, shown in FIG. 1, extending beyond slot 28 when tab 36 is positioned in slot 28. A pin 52 secures tab 36 in slot 28. Pin 52 has a sharp end 54 for piercing tab 36 at extended portion 50. Pin 52 can be any suitable securing device and may take a variety of shapes so long as it secures tab 36 in slot 28 via extended portion 50. For structural elements made of material which cannot be easily pierced, extended portion 21 may have an aperture 56, shown in FIG. 3 formed in tab 38, in which pin 52 can be positioned. Tab 36 and slot 28 may be sized for a tight fit thereby eliminating the need for pin 52.

An advantage of the tab and slot construction is that bird observatory 2 may be quickly and easily constructed or disassembled. Frontal element 4 can be easily removed by simply pulling frontal element 4 apart from tabs 20, 22, 28, 30. In this manner users may quickly access observatory 2 for introduction of nesting materials or food or to gain entrance for any other reason such as monitoring of eggs or cleaning of observatory 2.

Figure 2:
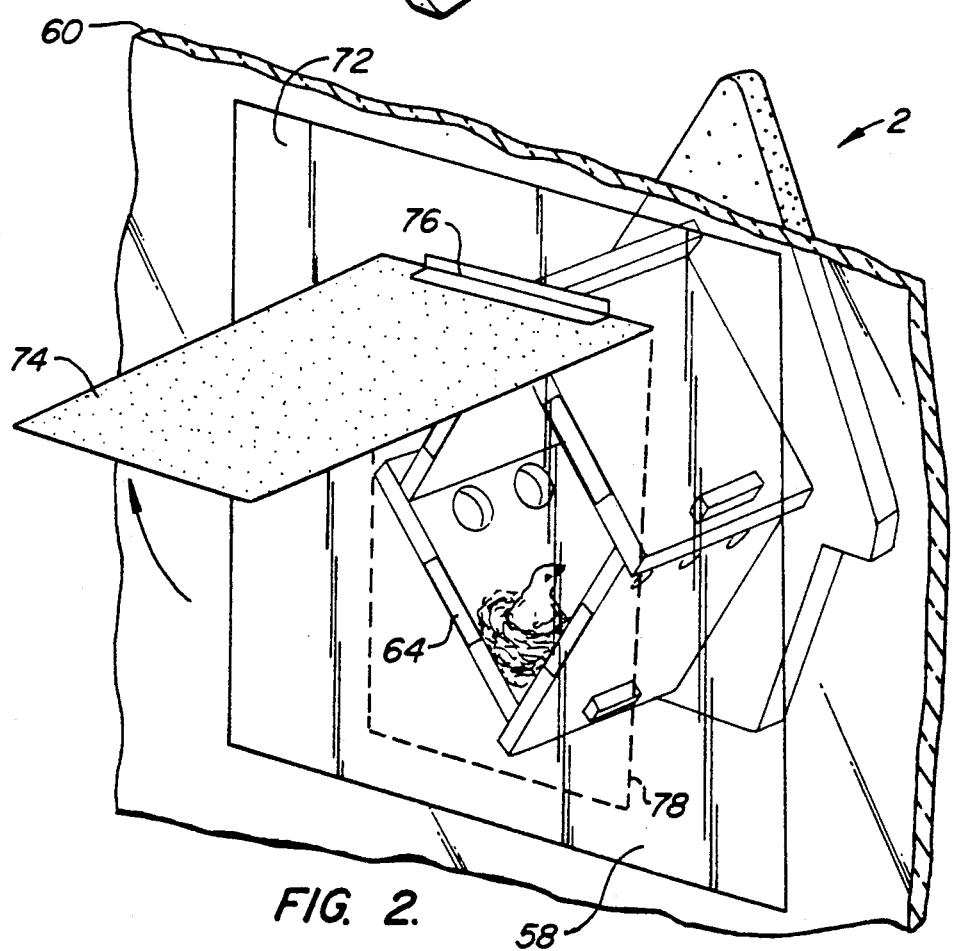
FIG. 2 illustrates the bird observatory installed adjacent a glass window with the opaque cover positioned to permit observers to see into the bird enclosure.

The preferred embodiment illustrated in FIG. 2 shows bird observatory 2 positioned adjacent a glass window 60. Enclosure 14 is attached to glass window 60 via an adhesive tape 62. Adhesive tape 62 has an adhesive surface 64, shown in FIG. 2, used to adhere bird observatory 2 to glass window 60. Adhesive tape 62 has a removable tape 66 which covers adhesive surface 64 until removed and when removed exposes adhesive surface 64. As shown in FIG. 2, roof and floor elements 6, 8, 10, 12 each have one adhesive tape 62 for adhering bird observatory 2 to glass window 60. Various other adhesive methods can be employed to adhere bird observatory 2 to glass window 60 such as direct application of a glue or using a velcro-type fastener.

A one-way window 58 is positioned adjacent glass window 60 opposite enclosure 14. One-way window 58 enables observers to see the birds under appropriate light conditions without the birds being able to see the observers. Glass window 60 may be any suitable transparent material through which observers may see the birds such as a sliding glass door or glass wall. One-way window 58 is mounted to glass window 60 using a glue 72, however, any other adhesive method can be employed, such as adhesive tape 62 or a velcro-type fastener.

Observatory 2 also includes an opaque cover 74. As shown in the preferred embodiment of FIG. 2, opaque cover 74 is provided on the side of glass window 60 opposite enclosure 14. Opaque cover 74 is hingedly mounted to one-way window 58 via an adhesive strip 76. As shown, opaque cover 74 is positioned spaced apart from window 60 permitting observers to see into bird observatory 2. When opaque cover 74 is positioned adjacent one-way window 58, as shown by position phantom lines 78 in FIG. 2, one-way window 58 is covered adjacent enclosure 14 so that vision in either direction through one-way window wall 58 is blocked.

In an alternate embodiment, one-way window 58 is mounted to the same side of window 60 as enclosure 14. Enclosure 14 is mounted via adhesive surface 64 directly to one-way window 58 rather than glass window 60. Opaque cover 74 is hingedly attached to window 60 opposite enclosure 14 via adhesive strip 76.

In yet another embodiment, observatory 2 may be provided with vertical support independent of window 60. For example, observatory 2 may be supported by the lower branches of a tree or mounted to a post in the user's backyard. For such a use, one-way window 58 is mounted directly to enclosure 14 via adhesive surface 64 with opaque cover 74 hingedly mounted via adhesive strip 76 directly to one-way window 58.

One-way window 58 can be made from any conventional one-way window material. One-way window materials can be defined by their coefficients of refraction and reflection. These coefficients indicate the transmitive and reflective properties of the particular one-way window material. One cannot see out of a one-way window if light impinging on the one-way window from the observation side is relatively brighter than the light impinging upon the one-way window from the observed side. The term "relatively brighter" does not mean brighter in an absolute sense but brighter with respect to light intensity and the applicable coefficients of reflection/refraction. With respect to bird observatory 2, if light in bird observatory 2 is relatively brighter than light from the observation side observers can see into bird observatory 2 without the birds being able to see the observers through the one-way window. Conversely, if light from the observation side is relatively brighter than light within bird observatory 2 then the birds can see out of one-way window 58.

Opaque cover 74 permits observers to select times for viewing when the relative light conditions are such that the birds cannot see out through one-way window 58. When the lighting is insufficient for viewing, opaque cover 74 can be positioned adjacent glass window 60 so birds within enclosure 14 cannot see out through one-way window 58. Bird observatory 2 may be made of translucent materials to increase the amount of light in enclosure 14 thereby improving the relative lighting conditions. Additional openings 44 also enhance lighting conditions in enclosure 14. Also, an interior light could be used inside enclosure 14 to help create good viewing conditions.

Modification and variation can be made to the disclosed embodiment without departing from the subject of the invention as defined by the following claims.

What is claimed is:

1. A bird observatory comprising:
   a bird enclosure having at least one opening permitting birds to enter and exit the enclosure;
   a one-way window; and
   an opaque cover moveable-between a first position covering at least a part of the one-way window and a second position spaced apart from the one-way window providing visual access to the at least part of the one-way window.

2. The bird observatory of claim 1 further comprising a plurality of structural elements having at least one slot and at least one tab, the at least one tab being inserted in t he at least one slot when the observatory is constructed.

3. The bird observatory of claim 2 further comprising a pin inserted through the at least one tab such that the pin holds the at least one tab in place when the at least one tab is inserted in the at least one slot.

4. The bird observatory of claim 1 wherein the enclosure comprises a translucent material.

5. A bird observatory for positioning adjacent a window having first and second sides comprising:
   a bird enclosure positioned adjacent the first side of the window and having at least one opening permitting birds to enter and exit the enclosure;
   a one-way window positioned adjacent the window; and
   an opaque cover moveable between a first position adjacent the second side of the window and covering at least a part of the one-way window and a second position spaced apart from the second side providing visual access to the at least part of the one-way window.

6. The bird observatory of claim 5 wherein the one-way window is positioned adjacent the second side of the window.

7. The bird observatory of claim 5 wherein the one-way window is positioned adjacent the first side of the glass window.

8. The bird observatory of claim 5 wherein the enclosure further comprises an adhesive means for attaching the enclosure to the window.

9. The bird observatory of claim 8 wherein the adhesive means comprises an adhesive surface and a removable tape, the removable tape covering the adhesive surface until removed and when removed exposes the adhesive surface so that the bird observatory may be attached to the window via the adhesive surface.

10. The bird observatory of claim 5 wherein the opaque cover further comprises a means for hingedly mounting the opaque cover.

11. The bird observatory of claim 5 further comprising a plurality of structural elements having at least one slot and at least one tab, the at least one tab being inserted in the at least one slot when the observatory is constructed.

12. The bird observatory of claim 11 further comprising a pin inserted through the at least one tab such that the pin holds the at least one tab in place when the at least one tab is inserted in the at least one slot.

13. A bird observatory for positioning adjacent a window having first and second sides comprising:
- a bird enclosure attached to the first side of the window and having at least one opening permitting birds to enter and exit the enclosure;
- a one-way window mounted to the second side of the window opposite the enclosure;
- an opaque cover hingedly mounted to the one-way window and moveable between a first position opposite at least a part of the one-way window and a second position spaced apart form the second side providing visual access to the at least part of the one-way window;
- a plurality of structural elements having at least one slot and at least one tab, the at least one tab being inserted in the at least one slot when the enclosure is constructed; and
- a pin inserted through the at least one tab such that the pin holds the at least one tab in place when the at least one tab is inserted in the at least one slot.

* * * * *